Nov. 7, 1944.  D. G. MOORE  2,362,019
MOTION PICTURE PROJECTOR
Filed Aug. 24, 1940   5 Sheets-Sheet 1
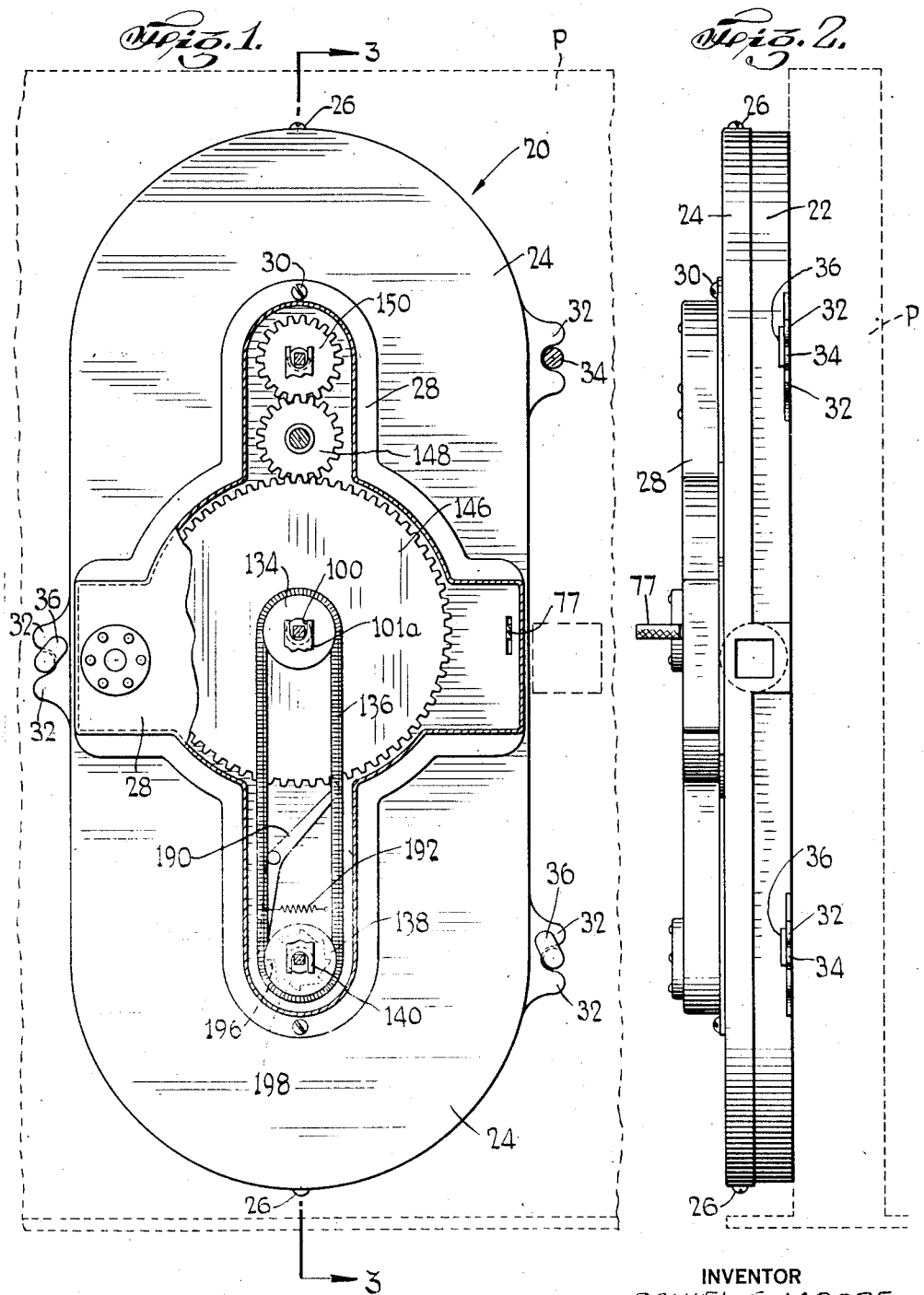
INVENTOR
DANIEL G. MOORE
BY
ATTORNEY

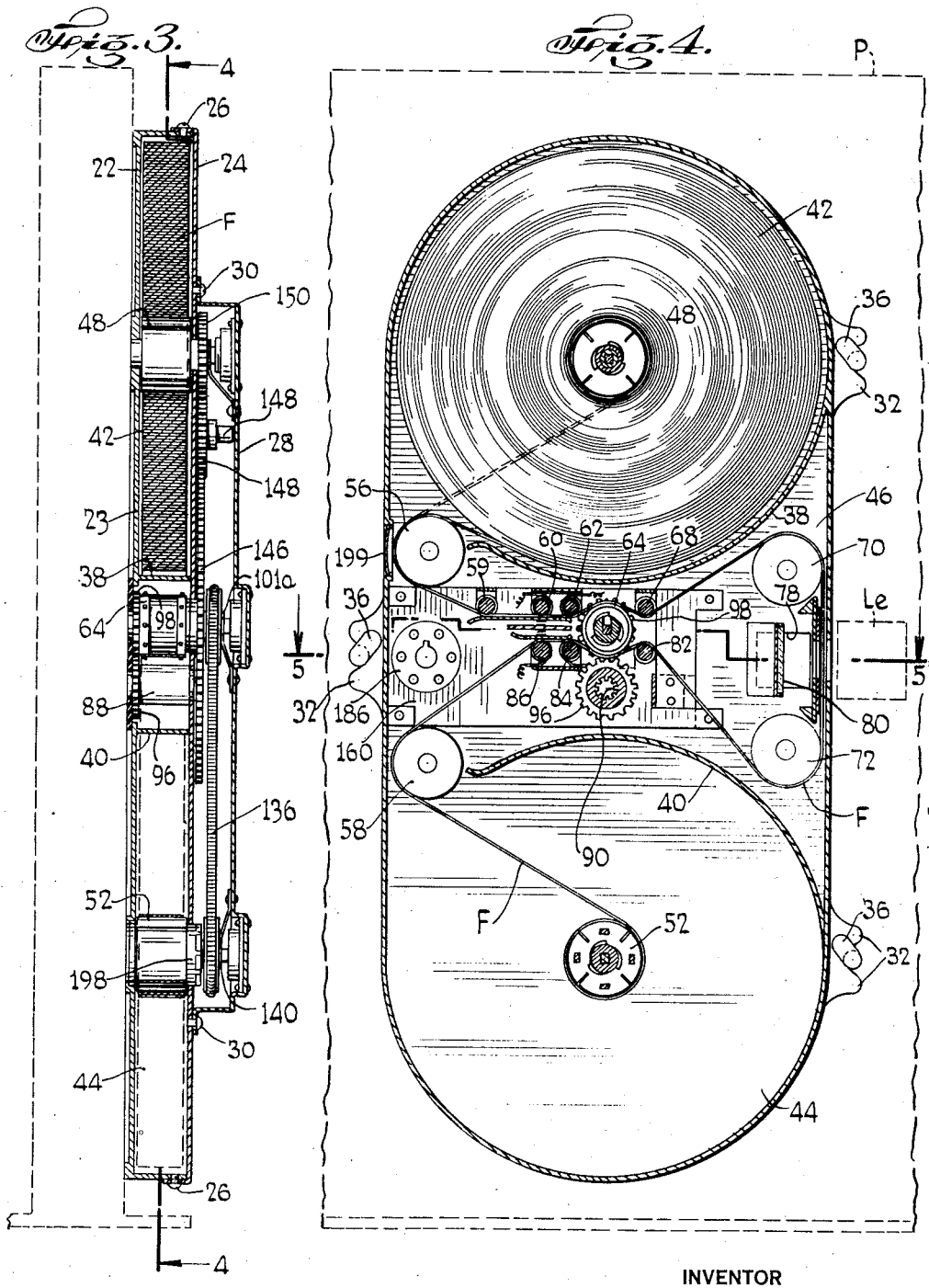

Nov. 7, 1944.     D. G. MOORE     2,362,019
MOTION PICTURE PROJECTOR
Filed Aug. 24, 1940     5 Sheets-Sheet 3

INVENTOR
DANIEL G. MOORE
BY
ATTORNEY

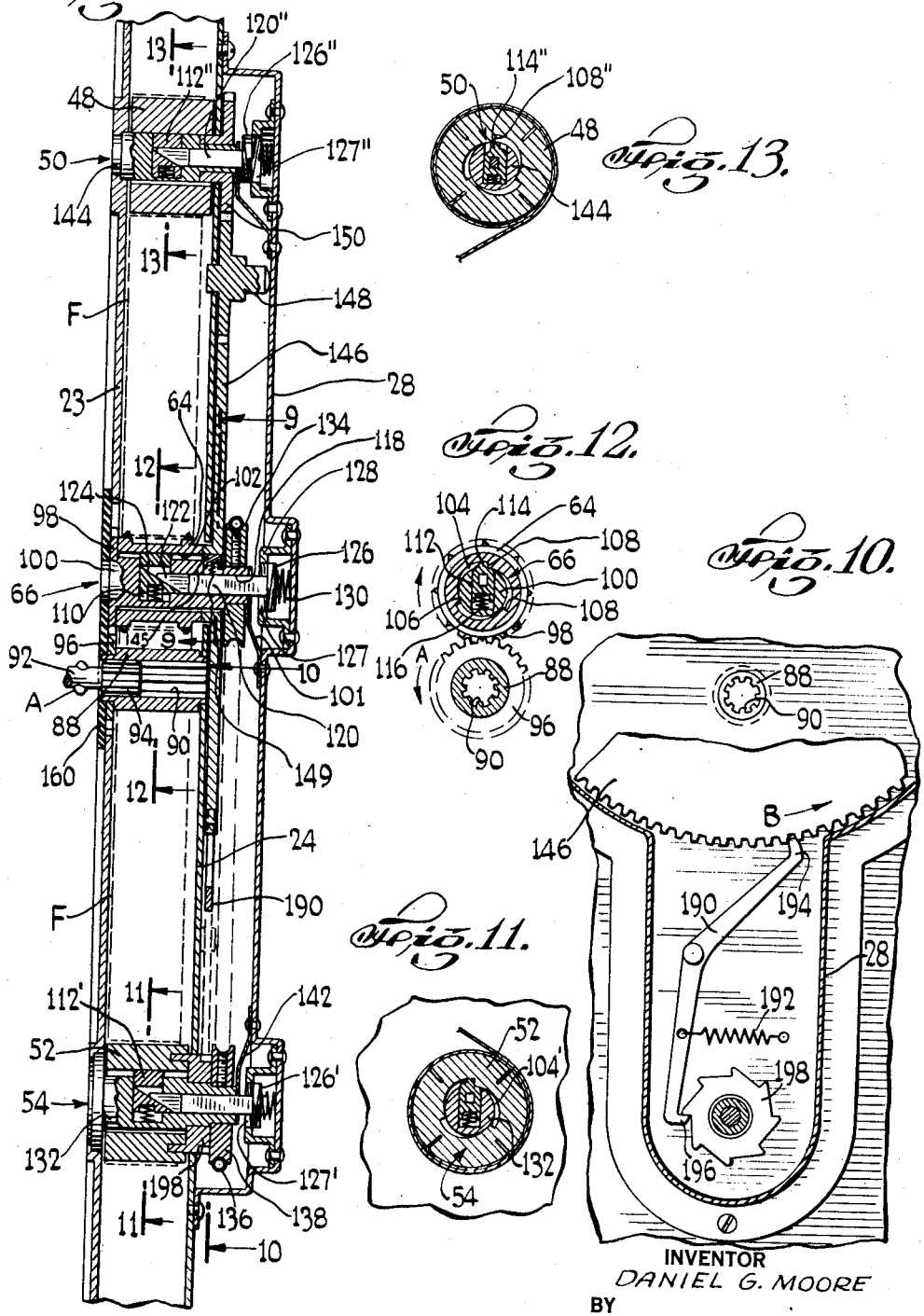

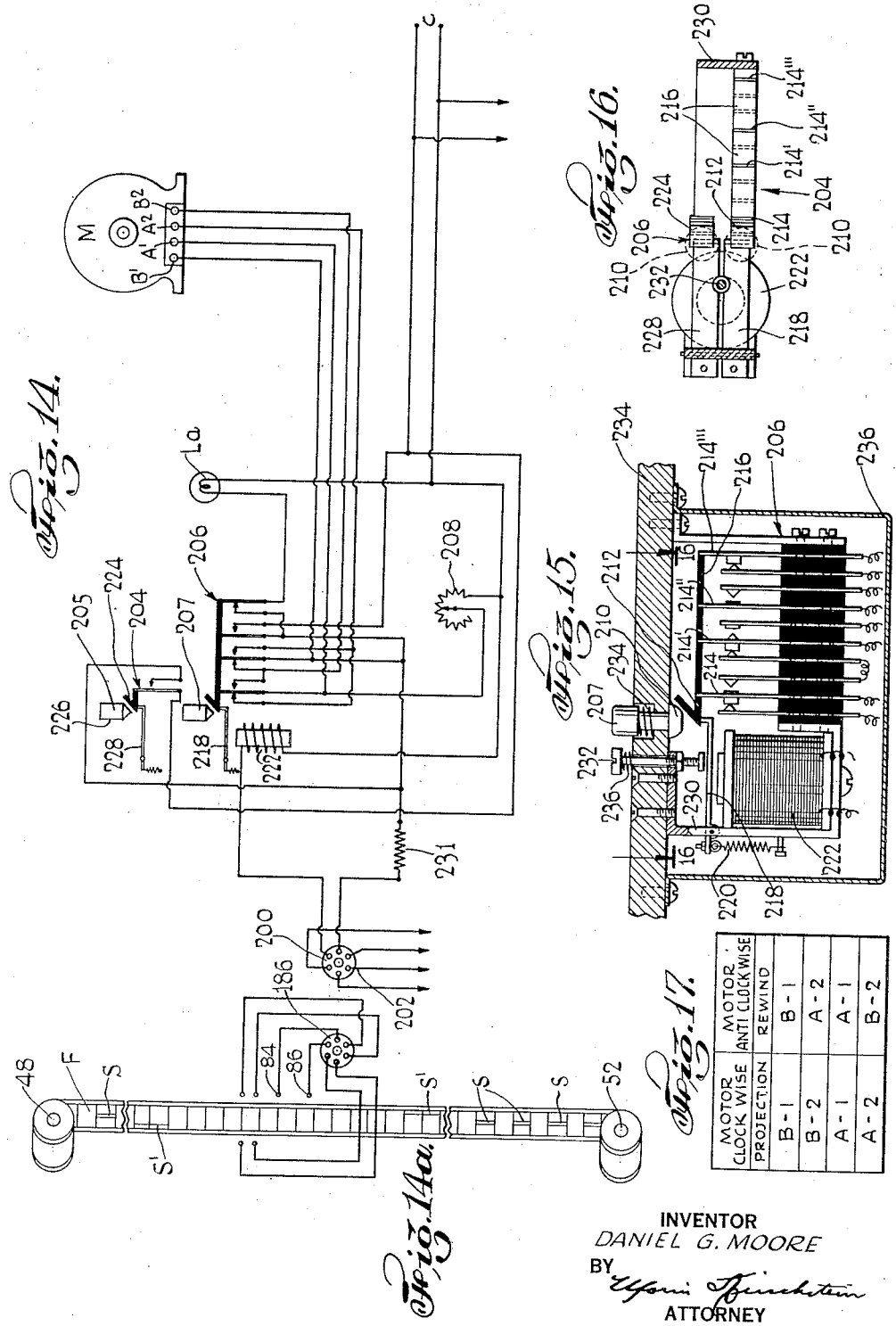

Patented Nov. 7, 1944

2,362,019

UNITED STATES PATENT OFFICE 2,362,019

MOTION-PICTURE PROJECTOR

Daniel G. Moore, Brooklyn, N. Y., assignor to Willard B. Kapper, New York, N. Y.

Application August 24, 1940, Serial No. 354,131

8 Claims. (Cl. 88—17)

This invention relates to motion picture projectors and more particularly to a self-contained film cartridge therefor.

It is common practice in the use of motion picture projectors to place a roll of film upon a supply spindle, unwind a short portion of the film, thread this portion through the various sprockets of the film gate, advancing mechanism, sprockets, guides, shutter, etc., which comprise the work path of the film, and to then catch the end of the film on the take-up spindle. It is rather difficult for an inexperienced user to satisfactorily perform this threading operation in the short time necessary to maintain continuity between consecutive reels.

One of the objects of my invention, therefore, is to provide a highly practical and efficient film magazine or cartridge which contains a roll of film and which may be slipped into position on a projector which is adapted to receive the same, whereupon it is ready for projection without further manipulation on the part of the operator.

Another object of my invention is to provide a film cartridge of the character described which shall be compact and rugged in construction, efficient in operation, and simple and economical to manufacture and assemble.

Further features of this invention relate to the electric control for the film magazine, whereby rotation of the spool is automatically stopped when either end of the film reel is approached during projection or rewinding, the film is started or stopped by manipulating control buttons, the projector lamp automatically extinguished during rewinding, and whereby the film may be stopped at any desired point.

Other features of this invention relate to the automatic clutching mechanism employed to drive the film take-up and supply spindles and the intermittent film advancing sprocket. This mechanism enables continuous actuation of the several driving means for the spindles and sprocket and allows the direction of motion of each of said means to determine whether or not the corresponding spindle or sprocket will be rotated.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the appended claims.

In the accompanying drawings, in which is shown one of the various possible embodiments of this invention, Fig. 1 is a side view of a film cartridge embodying my invention mounted on a projector, with a portion of the outer casing broken away to show the driving trains;

Fig. 2 is a front view thereof;

Fig. 3 is a sectional view taken substantially along the line 3—3 of Fig. 1;

Fig. 4 is a sectional view taken substantially along the line 4—4 in Fig. 3, showing the interior of the cartridge with the cover removed;

Fig. 8 is an enlarged view of a portion of the magazine shown in Fig. 3, but with the film sprocket and supply and take-up spindles cut away to show the automatic clutching mechanism disposed interiorly thereof;

Fig. 10 is a sectional view taken substantially along the line 10—10 in Fig. 9, showing the mechanism employed to automatically stop rotation of the film take-up spool as soon as rewinding ceases;

Figure 5:
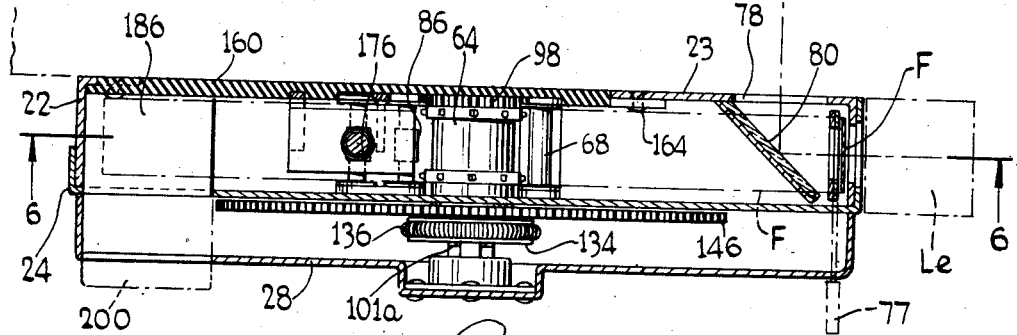
Fig. 5 is an enlarged sectional view taken substantially along the line 5—5 in Fig. 4, the projector lamp and lens being indicated schematically.
Figure 6:
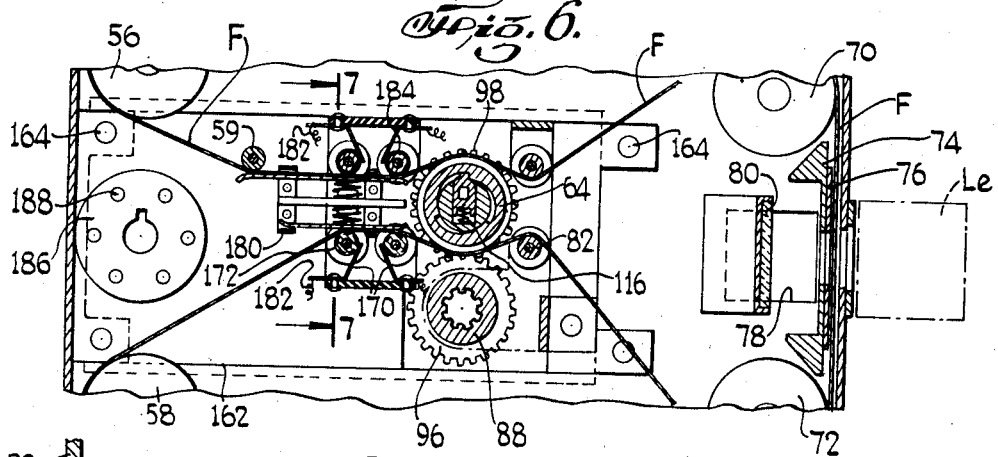
Fig. 6 is a sectional view taken substantially along the line 6—6 in Fig. 5 and illustrates the lay-out of the sprocket, guides, projection station and control mechanism.
Figure 7:
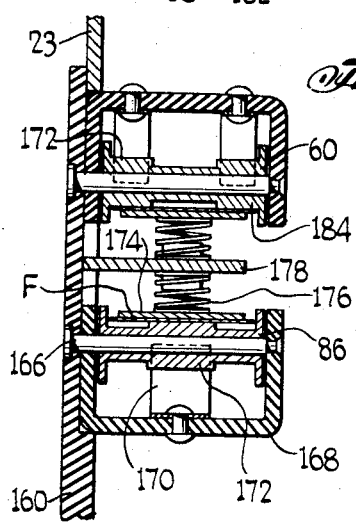
Fig. 7 is an enlarged sectional view taken substantially along the line 7—7 in Fig. 6 and illustrates in detail the automatic guide roller switches shown in Fig. 6.
Figure 9:
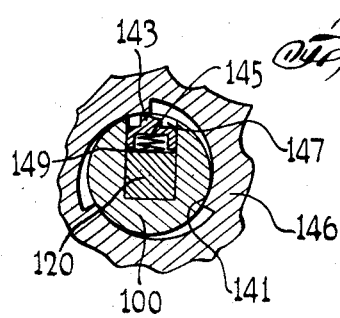
Fig. 9 is a sectional view taken substantially along the line 9—9 in Fig. 8, showing the unidirectional driving means employed during rewinding the film.

Figs. 11, 12 and 13 are sectional views of various details taken along the lines 11—11, 12—12 and 13—13 respectively in Fig. 9;

Fig. 14 is a wiring diagram of the electric circuit employed to control the operation of the projector;

Fig. 14a is a wiring diagram of the electric circuit in the film magazine;

Fig. 15 is an elevational view in section of the control switch shown in Fig. 14;

Fig. 16 is a top plan view of the relay coil and associated jack switches shown in Figs. 14 and 15; and Fig. 17 is a table indicating the changes in wiring for reversal of the projector motor.

Referring now to the drawings and more particularly to Figs. 1 through 13, the film magazine or cartridge 20 is seen to comprise a metallic housing 22 having a cover 24 detachably held thereto as by means of a plurality of screws 26. A casing 28 overlies a portion of the cover 24 and is attached thereto by means of screws 30. Said casing is adapted to house the driving trains hereinafter described.

For ready attachment of the magazine 20 to a motion picture projector P, indicated by dotted lines in Figs. 1 through 5, I provide three pairs of spaced ears 32 on the housing 22 which are adapted to receive stud posts 34 mounted on the side wall of the projector P. Said posts 34 have pivotally mounted spring arms 36 at their outer ends which can be rotated to overlie the ears 32 and firmly position the magazine 20 on the projector P.

Referring now to Figs. 3 and 4, it will be seen that the interior of the housing 22 is divided by a pair of arcuate walls 38 and 40 into a film supply chamber 42, a film take-up chamber 44 and an intermediate chamber 46 in which are housed the film actuating mechanism and automatic stopping devices. The film F in the supply chamber 42 is wound about a film supply spindle 48 mounted on an automatically clutched driving mechanism 50 (see Figs. 8 and 13) hereinafter described. In like manner the film in the take-up chamber is supported on a take-up spindle 52 likewise carried on an automatically clutched driving mechanism 54 (see Figs. 8 and 11).

In order to support and guide the film F in its path from the film supply chamber 42 and into the film take-up chamber 44, I provide a pair of guide rollers 56 and 58 (Figs. 4 and 6) so positioned with respect to the spindles 48 and 52 and arcuate walls 38 and 40 that the film F will not brush against any internal parts of the magazine 20 during either projection or rewinding. The film F, after it traverses the roller 56 during projection, passes over a guide roller 59 which positions the film in the path of a pair of guide roller switches 60 and 62 whose function will be hereinafter described. The film next rides over an intermittent film advancing sprocket 64 carried by an automatically clutched driving mechanism 66 (see Figs. 9 and 12). To keep the film in contact with the upper periphery of the sprocket 64, I provide another guide roller 68 disposed forwardly of the said sprocket. The film, after leaving the guide roller 68, is supported by a pair of rollers 70 and 72 which define between them the work path of the film F during projection.

Disposed intermediate the rollers 70 and 72 is a film gate 74 having a pressure pad 76 spring-mounted on its forward face and adapted to urge the film F lightly but firmly against the forward face of the housing 22. The film gate pressure pad and housing are suitably apertured to provide for the passage of a light beam. I also form an aperture 78 in the side wall of the housing 22 adjacent the projector P to allow light to enter the housing 22 from the projector lamp $L_a$ (see Fig. 5). The film gate 74 may be slidably mounted on the forward face of the housing 22 and be provided with an arm 77 to frame a projected scene on the screen. An inclined mirror 80 is mounted on said housing to reflect the light from the lamp $L_a$ and direct the same through the apertures in the film gate, pressure pad, film and forward wall of the housing 22, as indicated by the dot and dash in Fig. 5.

A suitable set of lenses $L_e$ is also carried by the projector P in optical alignment with the projection system. After the film leaves the roller 72 it is guided by another roller 82 onto the lower surface of the sprocket 64. From the latter it passes in succession over a pair of guide roller switches 84 and 86, which are similar in operation to the roller switches 60 and 62, and then is finally threaded over the roller 58 and on to the film take-up spool 52.

It will thus be seen that when the sprocket 64 is intermittently rotated in a clockwise direction, it will intermittently advance the film to and beyond the projection station at the front of the housing 22. At the same time it is necessary to rotate the film take-up spindle 52 in a clockwise direction by means of a slip drive and to allow the film supply spindle 48 to freely unwind in a clockwise direction. Also during rewinding the film supply spool 48 must be positively driven in a counterclockwise direction while the sprocket 64 and film take-up spool 52 should be free to rotate in a counterclockwise direction. In accordance with my invention, the following mechanisms are provided to accomplish these operations:

Journalled between the side wall 23 of the housing 22 and the cover 24 thereof is a shaft 88 (see Figs. 6, 8 and 12) having an interiorly grooved passageway 90 adapted to receive the free end of a shaft 92 extending from the projector P. A plurality of splines 94 are formed on the free end of the shaft 92 and cooperate with said grooved passageway 90 to couple the shafts 92 and 88 for simultaneous rotation when the magazine 20 is positioned on the projector P.

Any suitable means, such as a Geneva movement (not shown) is provided in the projector P for intermittently rotating the shaft 92, said means being synchronized with a shutter (not shown) also associated with the projector P, which intermittently intercepts the beam of light traveling between the lamp $L_a$ and the aperture 78 in the side wall of the housing 22.

Attached to the shaft 88 for rotation therewith is a pinion 96 permanently meshed with a spur gear 98 fixed to a shaft 100 which serves as the driving element for the clutch mechanism 66. Said shaft 100 carries the sprocket 64 and is journalled between the side wall 23 and the cradled end 101a of a spring 101 supported on the casing 28. Means is provided in association with the shaft 100 for driving the sprocket 64 in a clockwise direction when the shaft 92 is intermittently rotated, for projection, in a counterclockwise direction, as indicated by the arrow A in Figs. 8 and 12, and for allowing said sprocket 64 to freely rotate about the shaft 100 when the direction of rotation of the shaft 92 is reversed for rewinding. Such means comprises a bore 102 in the sprocket 64, which bore is provided with a plurality of arcuate notches 104. These notches 104 are so shaped that one end 106 of each notch is substantially tangential to the surface of the bore 102, so that these tangential ends serve as a bearing for the shaft 100. The other end of each notch 104 forms a shoulder 108.

Reciprocably carried within a transverse channel 110 in the shaft 100 is a slidable pin 112 having a lug 114 on the projecting end thereof. Said pin is normally urged radially outwardly of the shaft 100 by a spring 116, so that when the shaft 100 is rotated in a clockwise direction and the pin 112 is acted upon only by the spring 116, the lug 114 will abut a shoulder 108 and drive the sprocket 64 in a clockwise direction.

The shaft 100 is also provided with a square axial bore 118, wherein is slidably disposed an inner square shaft 120 having a wedge shaped nose 122 adapted to cooperate with a wedge shaped recess 124 in the slidable pin 112; so that when the shaft 120 is moved towards the left (Fig. 8) the pin 112 will be drawn radially inwardly of the shaft 100 and allow the sprocket 64 to rotate freely about said shaft. At the other end of the shaft 120 there is mounted a disc 126 having a left hand screw thread formed on its periphery for engaging a threaded aperture 127 in a plate 128 spaced from the casing 28. A spring 130 constantly urges the disc 126 and shaft 120 towards the pin 112 when the disc is disposed towards the right of the plate 128 (Fig. 8).

It will now be apparent that when the shaft 92 rotates in a counterclockwise direction for projection, the shafts 100 and 120 will rotate in a clockwise direction. This rotation of the shaft 120 will cause the threads on the disc 126 to engage the threaded aperture 127 and move to the right hand side of plate 128, thus retracting the nose 122 from the slidable pin 112 and allowing the lug 114 to abut the shoulder 108, as above described, to rotate the sprocket 64 in a clockwise direction. When the direction of rotation of the shaft 92 is reversed, the shafts 100 and 120 will rotate in a counterclokwise direction, the threaded disc 126 will be pressed by the spring 130 into engagement with the threaded aperture 127 and cause said disc to pass through the plate 128 until it rests on the left hand side of said plate. This displacement of the shaft 120 will cause the nose portion 122 to enter the wedge shaped recess 124 and retract the lug 114 from its position abutting the shoulder 108, thus freeing the sprocket 64 for rotation about the shaft 100.

The spring 116, by pressing the pin 112 upwardly, causes a camming action between the sloped surfaces of the recess 124 and nose 122, whereby the shaft 120 is urged against the plate 128; so that upon reversal of the shaft 92 after rewinding the disc 126 will be ready again to pass towards the right through the aperture in the plate 128.

While the shaft 100 is rotating in a clockwise direction during projection, it drives the shaft 132 of the film take-up clutch mechanism 54 in the same direction through the slip train comprising pulley 134 (Figs. 1 and 8), wire-spring drive belt 136, and pulley 138. The shaft 132 is journalled between side wall 23 of the housing and the cradled end 140 of spring 142 which is supported on the casing 28. The bore of the film take-up spindle 52 is formed similarly to that of the sprocket 64. Also, the various members of the clutch mechanism 54 are identical with those of the mechanism 66 and are indicated and hereinafter referred to by the same numerals primed.

The rewinding shaft 144 of the film supply clutch mechanism 50 is driven at a high rotative speed by the shaft 100 through the gear train comprising a large spur gear 146 mounted on the shaft 100, an idler gear 148 journalled between the cover 24 and casing 28, and a pinion 150 fixed to the shaft 144. It is desirable to actuate this gear train only when the film F is being rewound. To this end, the shaft 100 is received in an arcuately notched aperture 141 (Fig. 9) in the gear 146. This aperture 141 cooperates with a nub 143 on a slidable pin 145 reciprocable in a transverse channel 147 in the shaft 100 and urged radially outwardly by a spring 149. The shaft 144 is journalled similarly to the shaft 132 and comprises part of a clutch mechanism 50 whose elements are the same as the elements of the mechanism 66, the parts thereof being indicated and hereinafter referred to by the same numerals double primed.

The notches 104", however, are disposed in an opposite direction to the notches 104 and 104', and the screw thread on the periphery of the disc 126" and in the aperture 127" are right hand as distinguished from the left hand thread employed in the clutch mechanisms 66 and 54 in association with the discs 126 and 126' and threaded apertures 127 and 127'.

It is thus seen that when the shaft 92 rotates in a counterclockwise direction for projection, the sprocket 64 and the take-up spindle 52 will be positively driven in a clockwise direction. The supply spindle will now freely rotate about the shaft 144, since upon the first turn of said shaft the lug 114" will abut the shoulder 108" and the disc 126" will shift to the left, thus retracting the sliding pin 112". Also the nub 143 will slip past the notches 141. When the direction of rotation of the shaft 92 is reversed, the pins 112 and 112' will be retracted owing to counterclockwise rotation of the shafts 100 and 132. The sprocket 64 and take-up spindle 52 will then freely rotate about their respective shafts 100 and 132 and the nub 143 will engage a notch 141 to start up the gear train and rotate the shaft 144. The internal shaft 120" will then shift to the right, allowing the pin 112' to move radially outwardly and the lug 114" will abut against a shoulder 108", thus causing positive counterclockwise rotation of the supply spindle 48.

In accordance with my invention, the roller switches 84 and 86 are adapted to cooperate with portions of the film F to provide an automatic electric control for stopping movement of the film during projection or rewinding when the film approaches either of its ends. To this end, the central portion of the wall 23 is fashioned from an electric insulating panel 160 which is inserted in an aperture 162 in the wall 23 and held thereto by any suitable means, such as screws 164. It will be noted that the guide rollers 59, 68 and 82, as well as the shaft 88 and sprocket 64, are shown as being supported in the insulating panel 160. However, these elements may, if desired, be carried by the metallic portion of the side wall 23.

The said roller switches 84 and 86 are rotatably supported o the insulating panel 160 by means of a pin 166 (Fig. 7) which also serves to support framework 168 of insulating material for the electrical connectors 170. Each roller switch 84, 86 is provided with a central shoulder 172 which is adapted to rest against the center of the film F. In order to insure firm contact between the film F and the said shoulders 172, I provide a floating shoe 174 which is urged downwardly into contact with the rollers 84 and 86 by a spring 176 compressed between the shoe 174 and the plate 178 rigidly attached to the insulating panel 160. Guide members 180 prevent disalignment of said shoe 174. The film F carries a plurality of centrally disposed spaced short metallic strips S (see Fig. 17) which are so positioned on the film as to be in registry with the shoulders 172 of the roller switches 84 and 86. When, during the operation of the projector, the strips S bridge the shoulders 172, an electric circuit, hereinafter described, is completed through said strips, shoulders 172, conductors 170 and lead wires 182, whereby the supply of current to the projector motor is cut off and thus stopping projection or rewinding.

The roller switches 60 and 62 are mounted similarly to the rollers 84 and 86 but carry in place of the central shoulder 172 terminal shoulders 184 which cooperate with marginally disposed metallic strips S' on the film for synchronizing a sound record with the action of the scene projected from the film F, in the manner described in my copending application Serial No. 263,581, filed March 23, 1939.

A socket 186 attached to the insulating plate 160 has a plurality of apertures 188 which receive contact members (not shown) electrically connected by lead wires 182 to the roller switches 60, 62, 84 and 86 to place said switches in the electric control circuit hereinafter described.

When the film is being projected it is moving at a relatively slow speed; so that when the projector motor stops all the moving parts quickly come to rest. However, when the film is being rewound, the spindle 52 will be revolved at a very high rate immediately prior to the termination of the rewinding. Means must therefore be provided to independently stop rotation of the spindle 52 when the projector motor and its associated train of mechanisms are halted. This means comprises a bellcrank lever 190 (see Fig. 10) pivoted on the cover 24 and urged in a counterclockwise direction by a spring 192 tensioned between said lever and cover. One end of the bellcrank lever is provided with a finger 194 having a rounded end of slightly less width than the space between the teeth of the spurgear 146, and which is so positioned with respect to said gear that when the gear is stationary the finger will enter between the teeth thereof under the action of the spring 192. The other end of the bellcrank lever 190 is provided with a detent 196 which, when the finger 194 is disposed between the teeth of the gear 146, engages a shoulder on a ratchet 198 mounted for rotation with the spindle 52.

Thus, when the spindle 52 is rotated in a clockwise direction during projection, the high points of the ratchet 198 will merely shift the bellcrank lever 190 in a counterclockwise direction from the position indicated in Fig. 10; and as the gear 146 is stationary the operation of the magazine will not be affected. Also, during rewinding when the gear 146 is rotating in the direction shown by the arrow B in Fig. 10, the bellcrank lever 190 will be similarly shifted due to engagement of the finger 194 with the high points on the teeth of the gear 146, thus maintaining the detent 196 out of contact with the ratchet 198. However, as soon as the projector motor stops and the gear 146 slows down and halts, the finger 194 will enter in between the teeth in said gear. This allows the bellcrank lever to shift in a counterclockwise direction under the action of the spring 192 and causes the detent 196 to engage the ratchet 198 and bring the spindle 52 to an abrupt stop, thus preventing snarling of the film.

The magazine is assembled by inserting one end of the shaft 88 and of the shafts associated with the spindles 48 and 52 and sprocket 64 into the journals provided therefor in the side wall 23 or Bakelite panel 160. The film F which prior to insertion has been wound on one of the spindles 48 and 52 is then threaded in its work path and on to the other spindle. Next the cover 24 is put in position, thus journalling the other end of the shaft 88 with the rotating portions of the mechanisms associated with the spindles 48 and 52 and sprocket 64 freely projecting through the apertures provided for this purpose in the cover 24 (see Fig. 8). The driving trains are then slipped on the shafts 100, 132 and 144, and one stub end of the gear 146 is journalled in the cover 24. Finally the casing 28 is positioned to journal the unsupported ends of the said shafts and the other stub end of the gear 146. The magazine is disassembled for repair or replacement of the film F by reversal of these manipulations.

A window 199 (Fig. 4) may be provided for observing the film F.

The electrical control for the film magazine is shown in Figs. 14, 15, 16 and 17. Said control comprises a plug 200 having a plurality of prongs 202 adapted to enter into the apertures 188 of the socket 186 and make electrical connection with the contacts contained therein. Four of the prongs 202 (indicated by the arrows running from the plug 200 in Fig. 7) are connected to the electrical control disclosed in my above mentioned application Serial No. 263,581. The remaining two prongs engage the contacts associated with the roller switches 84 and 86 to incorporate them in the electrical control circuit for the film magazine. This circuit comprises a source of current supply C which is adapted to be connected through the forward and reverse jack switches 204 and 206 to the projector motor M. The said switches 204 and 206 are connected, as shown in Fig. 14, so that upon depression of either the forward or reverse push buttons 205 or 207, the motor field terminals are connected to each other, as indicated in the table given in Fig. 17 and to the source of current supply C. A motor control rheostat 208 is inserted in the electrical circuit to control the speed of the projector motor in both directions. The projector lamp L. is also connected in the circuit so that when the projector motor is energized for rotation to project the film, current will be supplied to the lamp L..

To operate the motor for rewinding the reverse button 207 is depressed, thus causing the mushroom cam 210 at the lower end of the button 207 to engage the inclined surface of a latch 212 carried by the front swing spring 214 of the reverse jack switch 206. As all the swing springs 214′, 214″ and 214′″ are connected by spacers 216, the motion of the latch 212 will cause them all to move to the right, thus releasing the armature 218 to pivot in a counterclockwise direction under the action of the spring 220 and locking the latch 212 and the swing springs 214′, 214″ and 214′″ in their extreme right position. In such position the projector motor will be connected so as to be operated in the reverse and rewinding direction until a strip S bridges the shoulders 172 on the roller switches 84 and 86. This will cause the electro-magnetic relay coil 222 to become energized and pivot the armature 218 in a clockwise direction to release the latch 212 and allow the swing springs to move towards their left hand position (shown in Figs. 14 and 15), thus breaking the circuit to the projector motor.

When it is desired to drive the motor M in a projecting direction, the forward push button 205 is depressed to cause the jack switch 204 to move into its extreme right position to electrically connect the motor M and projector lamp L. to the source of current supply C. The jack 204 has a latch 224 similar to the latch 212, which cooperates with a cam 226, schematically shown in Fig. 14, in a manner similar to the action of the cam 210. A separate armature 228 is pivoted on the frame 230 which supports the relay coil 222 and jack switches 204 and 206. This armature 228 is provided with a spring (not shown) which urges it in a counterclockwise direction in a manner similar to the armature 218 to hold the jack switch 204 in its extreme right hand position by engaging the latch 224. Energization of the relay coil 222 by bridging of the roller switches 84 and 86 with a contact strip S at the end of the film will break the supply of current to the projector motor M and lamp L_a.

A resistance 231 is inserted in series with the relay coil 222 so that only a small voltage will be applied to the conducting strips S.

If it is desired to stop the film at any point, it is merely necessary to depress an armature release button 232. This will cause both armatures 218 and 228 to move in a counterclockwise direction and release either one of the latches 212 or 224 which happens to be engaged with its corresponding armature. The forward and reverse push buttons 205 and 207 and armature release button 232 are normally maintained in inoperative position by means of springs 234 and 236. For convenience, the frame 230 and push buttons 205, 207 and 232 may be mounted on a control board 234 carried on the projector P. Also a box 236 may be provided to house the several electrical parts.

In operation of a projector employing my magazine and electric control, the operator ordinarily first pushes the forward button 205 to allow the film to be projected uninterruptedly for substantially its entire length and until a contact strip S is reached which halts projection. He now pushes the reverse button 207 to allow the film to rewind. If, however, the operator should erroneously again push the forward button 205, it will merely advance the film to the next strip S and thus no harm would be done.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. A film cartridge for use with a motion picture projector having a motor and single actuating means driven by said motor, said actuating means being accessible from the exterior of said projector, said cartridge comprising a housing adapted for demountable attachment to said projector, said housing having a side wall and peripheral edge walls, a cover for said housing, a casing mounted on said cover, film take-up and film supply spindles journalled in said housing and said casing and passing freely through said cover, a film advancing sprocket journalled in said side wall and said casing and passing freely through said cover, and a developed motion picture film carried by said spindles.

2. A film cartridge for use with a motion picture projector having a motor and single actuating means driven by said motor, said actuating means being accessible from the exterior of said projector, said cartridge comprising a housing adapted for demountable attachment to said projector, said housing having a side wall and peripheral edge walls, a cover for said housing, a casing mounted on said cover, film take-up and film supply spindles journalled in said housing and said casing and passing freely through said cover, a film advancing sprocket journalled in said side wall and said casing and passing freely through said cover, a developed motion picture film carried by said spindles, and a driving mechanism for said spindles and said sprockets housed within said casing.

3. In a motion picture film cartridge of the character described, a film take-up spindle, reversible means to drive said film take-up spindle, a clutch interposed between said driving means and said spindle, said clutch transmitting motion to said spindle when said driving means rotates in one direction and allowing said spindle to run free when the driving means rotates in the other direction, and means to prevent said spindle from running free when said driving means is stopped, said last named means comprising an element rigidly secured to and turning with said spindle, a blocking element movable into the path of travel of said first element to abruptly stop the same, and means to maintain said second element out of the path of travel of said first element while said driving means is operative in either direction.

4. A film cartridge for use with a motion picture projector, said cartridge comprising a housing adapted for demountable attachment to said projector, a film spindle in said housing, a developed motion picture film wound on said spindle, a reversible driving mechanism operable from the exterior of said housing by the operation of said projector, and one-way drive means interconnecting said mechanism and said spindle, said one-way drive means comprising a shaft disposed in an axial opening in said spindle, said spindle having a plurality of notches in said opening, each of said notches having one end thereof substantially tangential to the surface of said opening whereby to serve as a bearing for said shaft, the other end of said notch being spaced away from said shaft, a pin radially mounted in said shaft within said axial opening, and means to resiliently urge said pin outwardly of said shaft whereby when said shaft revolves in one direction it will drive said spindle and when said shaft revolves in the opposite direction it will not impart motion to said spindle.

5. A film cartridge for use with a motion picture projector, said cartridge comprising a housing adapted for demountable attachment to said projector, a film spindle in said housing, a developed motion picture film wound on said spindle, a reversible driving mechanism operable from the exterior of said housing by the operation of said projector, and one-way drive means interconnecting said mechanism and said spindle, said one-way drive means comprising a circular shaft disposed in an axial opening in said spindle, said spindle having a plurality of notches in said opening, each of said notches having one end thereof substantially tangential to the surface of said opening whereby to serve as a bearing for said shaft, the other end of said notch being spaced away from said shaft, a pin radially mounted in said shaft within said axial opening, means to resiliently urge said pin outwardly of said shaft whereby when said shaft revolves in one direction it will drive said spindle and when said shaft revolves in the opposite direction it will not impart motion to said spindle, and means to retract said pin inwardly of said shaft when said shaft is rotated in such direction as to not revolve said spindle whereby said spindle may be then revolved about said shaft in either direction.

6. A film cartridge for use with a motion picture projector, said cartridge comprising a housing adapted for demountable attachment to said projector, a film spindle in said housing, a developed motion picture film wound on said spindle, a reversible driving mechanism operable from the exterior of said housing by the operation of said projector, and one-way drive means interconnecting said mechanism and said spindle, said one-way drive means comprising a circular shaft disposed in an axial opening in said spindle, said spindle having a plurality of notches in said opening, each of said notches having one end thereof substantially tangential to the surface of said opening whereby to serve as a bearing for said shaft, the other end of said notch being spaced away from said shaft, a pin radially mounted in said shaft within said axial opening, means to resiliently urge said pin outwardly of said shaft whereby when said shaft revolves in one direction it will drive said spindle and when said shaft revolves in the opposite direction it will not impart motion to said spindle, and means to retract said pin inwardly of said shaft when said shaft is rotated in such direction as to not revolve said spindle whereby said spindle may then be revolved about said shaft in either direction, said last named means comprising a cammed surface on said pin, a cooperating cam mounted on said shaft and means to shift said cooperating cam upon reversal of rotation of said shaft.

7. A film cartridge for use with a motion picture projector, said cartridge comprising a housing adapted for demountable attachment to said projector, a film spindle in said housing, a reversible driving mechanism operable from the exterior by the operation of said projector, a one-way drive means intermediate said reversible driving mechanism and said spindle, said spindle being adapted to be rotated at a high angular velocity when said one-way drive mechanism is not transmitting power, and means to abruptly stop rotation of said spindle when said projector stops, said last named means comprising an element rigidly secured to and turning with said spindle, a blocking element movable into the path of travel of said first element to abruptly stop the same, and means to maintain said second element out of the path of travel of said first element while said driving mechanism is operative in either direction.

8. A film cartridge for use with a motion picture projector, said cartridge comprising a housing adapted for demountable attachment to said projector, a film spindle in said housing, a reversible driving mechanism operable from the exterior by the operation of said projector, a one-way drive means intermediate said reversible driving mechanism and said spindle, said spindle being adapted to be rotated at a high angular velocity in a film rewinding direction when said one-way drive mechanism is not transmitting power, and means to abruptly stop rotation of said spindle when said projector stops, said last named means comprising a ratchet rotatable with said spindle, a detent mounted on said housing, means to resiliently urge said detent towards said ratchet, and means to maintain said detent spaced from said ratchet when said spindle is turning in a film rewinding direction.

DANIEL G. MOORE.